United States Patent [19]

Shaffer

[11] Patent Number: 4,659,307
[45] Date of Patent: Apr. 21, 1987

[54] ALUMINUM HYDROXIDE STABILIZED SWITCH

[75] Inventor: John W. Shaffer, Williamsport, Pa.

[73] Assignee: GTE Products Corporation, Stamford, Conn.

[21] Appl. No.: 623,605

[22] Filed: Jun. 22, 1984

[51] Int. Cl.$^4$ ............................................. F21K 5/00
[52] U.S. Cl. .................................... 431/359; 362/15; 362/6; 362/11; 252/501.1
[58] Field of Search ............... 362/6, 11, 15; 431/359; 252/501.1, 514

[56] References Cited

U.S. PATENT DOCUMENTS 3,969,067  7/1976  Schupp ............................... 431/362
3,988,647  10/1976  Bolon et al. ..................... 431/359 X
4,330,821  5/1982  Brower et al. ................... 431/359 X
4,379,690  4/1983  Kling et al. ........................ 431/359

OTHER PUBLICATIONS

A New Dictionary of Chemistry, 1970, pp. 25–26.

Primary Examiner—Larry Jones
Assistant Examiner—Carl D. Price
Attorney, Agent, or Firm—Thomas H. Buffton; Martha Ann Finnegan

[57] ABSTRACT

A multilamp photoflash array responsive to either a relatively high or relatively low pulse potential includes normally open (N/O) switches formed from an admixture including sliver carbonate and/or silver oxide, titanium dioxide, a blender binder and aluminum hydroxide. Also, enhanced results are provided by the inclusion of a sulfur compound in the range of about 0.001 to 5.0 percent by weight within the admixture.

16 Claims, 3 Drawing Figures

4,659,307

ALUMINUM HYDROXIDE STABILIZED SWITCH

TECHNICAL FIELD

This invention relates to multilamp photoflash array and humidity-protected radiation-responsive switches and more particularly to switches and photoflash arrays which include such switches wherein the switches include aluminum hydroxide.

BACKGROUND ART

Generally, it is common to provide multilamp photoflash units which include a plurality of flashlamps each affixed to the electrical circuit of a printed circuit board. The electrical circuit is connectable to an energizing source, which may be of the so called high voltage type having a voltage of about 2000 volts or the low voltage type wherein the voltage is in the range of about 15 volts. Also, the photoflash unit often includes a radiation-responsive normally open (N/O) switch immediately adjacent all but one lamp of the multilamp units. Each of these switches responds to radiation from a nearby lamp in a manner to provide an electrically conductive path rather than the open or non-conductive path prior to exposure to radiation from a lamp.

Of the known problems associated with the above-described normally-open switches and multilamp photoflash units, resistance to humidity and to catastrophic failure due to burn off or blow off are perhaps two of the better known. More specifically, exposure to moisture conditions tends to cause a very erratic behavior of the usual normally-open type switch due to the tendency of the silver source of the composition to prematurely convert to a low resistance value. Also, the compactness of present day photoflash units necessitates a very close spacing of the lamps or radiation source and the radiation-responsive switches. Thus, the tendency for excess radiation or blow off of the switch is of increased concern.

One known attempt to alleviate the above described humidity problems includes the coating of the switch with a moisture barrier compound, such as a lacquer, for example. However, such coating techniques add another step to the process which is obviously undesirable because of the cost in both materials and efficiency of the process.

Further, it is known that the addition of a glass bead filler to the switch composition reduces the tendency toward blow off, and such a composition is described in U.S. Pat. No. 4,080,155 of Sterling. Moreover, an improvement on the above mentioned glass bead containing composition is disclosed in a co-pending application bearing U.S. Pat. No. 4,320,440 issued Mar. 16, 1982, and assigned to the present assignee. Therein, a filler material such as aluminum oxide or titanium dioxide is added to the composition in order to inhibit undesired blow off.

Also, it is known to utilize a blended binder of polystyrene and a thermoplastic in order to effect an enhanced resistance to humidity as disclosed in a pending application bearing U.S. Ser. No. 532,090 filed in the name of Michael R. Kling and assigned to the Assignee of the present application. As disclosed therein, although not completely understood, the blended binder appears to achieve a synergistic effect wherein a greater resistance to humidity is effected than is attainable with other known individual binder materials.

Further, it is known to include a sulfur compound in a stabilized silver switch in order to enhance the resistance thereof to humid conditions as disclosed in a co-pending application bearing U.S. Ser. No. 623,606, filed June 22, 1984 and filed in the name of the present inventor and assigned to the Assignee of the present Application. As disclosed therein, it is believed the humid and heat conditions cause the silver compounds to readily decompose whereupon the sulfur compounds act as a getter which inhibits formation of electrically conductive silver metal. Thus, enhanced switches which are highly resistant to humid conditions are provided.

Although the above described humidity and blow off protection procedures have been known, it is obvious that an added step to a process in order to provide moisture control is undesirable. Also, the above described addition of a filler material has only been referred to in connection with a high voltage type discharge device wherein a pulse potential having a limited direction is employed.

Also, even though the above-described techniques and procedures have provided enhanced photoflash units and radiation-responsive switches, it has been found that the available structures and apparatus still leave something to be desired in so far as moisture control under humid conditions is concerned. In other words, improved resistance to undesired effects due to moisture is a condition highly desirable in both radiation responsive switches and photoflash units employing such switches.

SUMMARY OF THE INVENTION

An object of the present invention is to provide an enhanced multilamp photoflash unit. Another object of the invention is to provide an enhanced photoflash unit having improved switching capability. Still another object of the invention is to provide an improved switch for a multilamp photoflash array. A further object of the invention is to provide an improved switch having increased resistance to moisture and suitable to a multilamp photoflash unit.

These and other objects, advantages and capabilities are achieved in one aspect of the invention by a multilamp photoflash unit having at least one humidity protected radiation-responsive switch which includes an admixture of silver carbonate and/or silver oxide, a filler material, a binder of blended polystyrene and thermoplastic and aluminum hydroxide.

In another aspect of the invention, a normally open (N/O) switch for a multilamp photoflash unit includes an admixture of silver carbonate and/or silver oxide, titanium dioxide, a blended binder of polystyrene and thermoplastic, silver-coated glass beads a sulfur compound and aluminum hydroxide.

BEST MODE FOR CARRYING OUT THE INVENTION

For a better understanding of the present invention, together with other and further objects, advantages, and capabilities thereof, reference is made to the following disclosure and appended claims in connection with the accompanying drawings.

Figure 1:
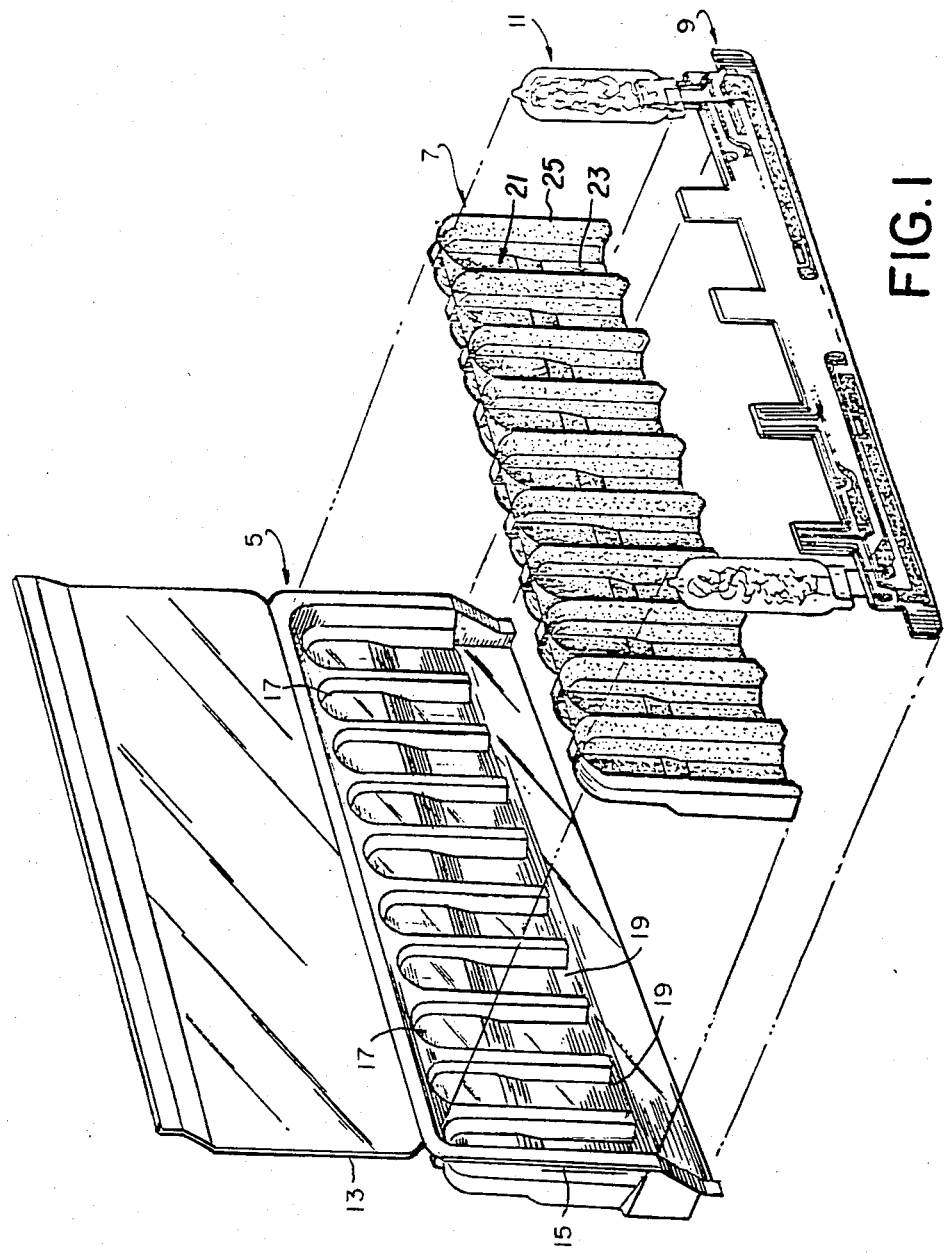
FIG. 1 is an exploded view of a preferred form of multilamp photoflash unit of the invention.

Referring to FIG. 1 of the drawings, a multilamp photoflash unit includes a plastic housing member 5, a reflector unit 7, a printed circuit board 9 and a plurality of photoflash lamps 11. The photoflash lamps 11 and the printed circuit board 9 are formed to be received by the reflector unit 7 and the reflector unit 7, in turn, is formed for positioning within the plastic housing member 5.

In greater detail, the plastic housing member 5 includes a light transmittable front portion 13 foldably connected to a back portion 15. The back portion 15 has a plurality of spaced cavities 17, and each of the cavities 17 includes an offset portion 19. The reflector unit 7 also includes a plurality of spaced cavities 21 each having an offset 23 and a reflective surface 25 on the surface of the spaced cavities 21. Also, the reflector unit 7 is formed for positional location within the cavities 19 of the back portion 15 of the plastic housing member 5.

The printed circuit board 9 includes an electrically conductive printed circuit 27 thereon with the flashlamps 11 affixed to the printed circuit 27. Also, the printed circuit board 9 includes a number of upstanding members 29 which are formed for positioning within the offset portion 23 of the cavities 21 of the reflector unit 7. The flashlamps 11 are located within the cavities 21 of the reflector unit.

Additionally, each of the upstanding members 29 of the printed circuit board 9 includes several conductive portions 31 of the printed circuit 27. These conductive portions 31 of the printed circuit 27 on each of the upstanding members 29 are overlayed with a normally open (N/O) switch composition 33.

Figure 2:
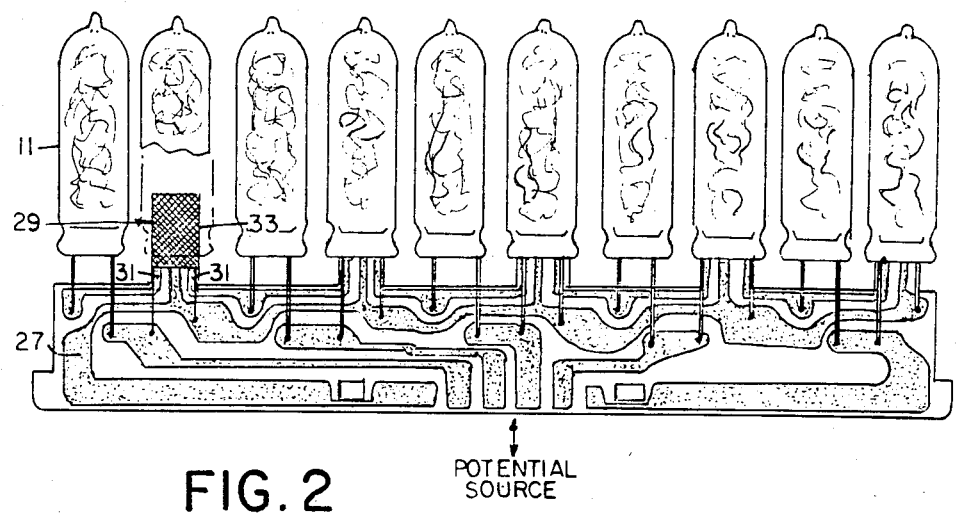
FIG. 2 is a more detailed illustration of the printed circuit board of the photoflash unit of FIG. 1.
Figure 3:
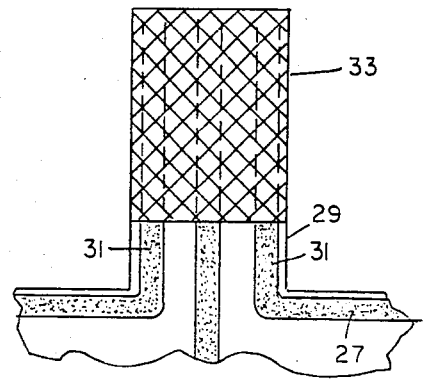
FIG. 3 is an enlarged illustration of a radiation-responsive switch of the printed circuit board of FIG. 2.

As can more readily be seen in the illustrations of FIGS. 2 and 3, the printed circuit 27 is formed for connection with each of the flashlamps 11 and for connection to a potential source within a camera (not shown). Also, the printed circuit 27 has a plurality of upstanding portions 29, and each has conductive portions 31 thereon which are overlayed with a switch composition 33 to provide a non-conductive path prior to radiation exposure and an electrically conductive path between the electrically conductive portions 31 after exposure to radiation from an adjacent flashlamp 11.

As to the humidity-protected radiation-responsive switch, a preferred admixture includes silver carbonate and/or silver oxide, titanium dioxide, a binder and aluminum hydroxide in the range of about 1.0 to 50.0 percent by weight and preferably about 1.0 to 2.0% by weight. Also, the admixture preferably, not necessarily includes silver-coated glass beads and a dispersing agent such as lecithin. Further, the binder is preferably a 50-50 blend of polystyrene and a thermoplastic material. Moreover, the previously-mentioned sulfur compound may be utilized in conjunction with the aluminum hydroxide.

Although titanium dioxide is preferred filler material, other suitable filler materials would be aluminum oxide, aluminum phosphate and silicon dioxide. Also, the thermoplastic binder material may be selected from a group consisting of styrene copolymers, cellulose esters, polyalkylarcylates, polymethalkyl methacrelates, vinyl polymers and polycarbonates. Moreover, a preferred material is a butadiene copolymer known as pliolite S-5D manufactured by the Goodyear Rubber Produces Co. of Newark, N.J.

More specifically, a preferred switch composition, especially suitable for use with cameras employing a pulse potential as great as 3000 to 4000-volts, would include the following components indicated in percentages by weight:

| | |
|---|---|
| Silver Carbonate | 24.66% |
| Silver Oxide | 24.66 |
| Titanium dioxide (filler) | 29.59 |
| Lecithin (dispersion) | 0.10 |
| Polystyrene (binder) | 2.47 |
| Butadiene (binder) | 2.47 |
| Silver-coated glass beads | 14.80 |
| Aluminum hydroxide | 1.25 |

Although not completely understood, it is believed that the silver compounds, silver oxide and/or silver carbonate, which are often employed in normally-closed switches for high voltage photoflash arrays are, of necessity, easily decomposed materials. In the presence of an organic reducing agent, such as the polymeric binder used, the silver compounds decompose to metallic silver due to the relatively mild heating produced by the radiant energy from a small photoflash lamp. Such conversion of the silver compound to a metallic and electrically conductive state is utilized to switch a subsequent flashlamp into the circuit and prepare the array to receive a following high voltage pulse potential from the camera.

However, the very necessary ease of decomposition of the silver compounds undesirably renders the switch readily susceptible to damage, especially during prolonged storage, in hot and humid climates. Even partial decomposition of these silver compounds can permit sufficient electrical leakage in a 3000 to 4000-volt camera pulse to undesirably allow simultaneous activation of two or more lamps in response to a single energizing pulse voltage. Obviously, such multiple flashing is not only wasteful of lamps but also ruins the resultant picture due to overexposure.

As previously mentioned, the employment of a blended binder composition such as disclosed in the application of Michael R. Kling enhances the resistance to humidity of the switch due to the synergistic effect of the blended binder materials. However it has been found that available switches for multilamp photoflash arrays still leave something to be desired.

Also, it has been found that the incorporation of elemental sulfur into a switch paste admixture affords switches with an enhanced degree of stabilization and resistance to moisture. It is believed that the sulfide ions act as a getter for free silver ions present prior to the formation of the previously-mentioned conductive silver metal in the presence of humid conditions.

Preferably, precipitated sulfur in the range of about 0.1 to 5.0 percent by weight of the admixture or switch paste is employed. When the sulfur content is increased beyond the above-mentioned 5.0 percent, it has been found that the conductivity performance of the heat-convertable switches can suffer due to the gradual conversion of conductive metallic silver into the undesired black sulfide.

Further, the fact that the preferred elemental sulfur offers humidity protection and is not itself electrically conductive does not necessarily rule out other sulfide ion sources. Specifically, low solubility sulfides of materials such as calcium or ferrous sulfide could be used as well as organic sulfide ion procursors such as triethylphosphine sulfide for example.

Finally, it has been found that the addition of aluminum hydroxide to radiation-responsive switch admixtures which include silver compounds enhances the resistance of the switch to humid and environmental acidic conditions. It is believed that the aluminum hydroxide provides a PH buffering action which compensates for undesired and increased acidic environmental conditions frequently encountered whenever humid conditions are also present. Thus, the aluminum hydroxide reduces the development of electrical conductivity in the switches during prolonged humid aging.

As a specific example, a series of tests were conducted wherein an admixture which includes silver carbonates, silver oxide, titanium dioxide, a 50-50 blend of binders and silver-coated glass beads was compared with a similar admixture having aluminum hydroxide added thereto and a further admixture which includes both aluminum hydroxide and sulfur. The compositions are as follows:

| Switch Composition (dried basis) | | | |
|---|---|---|---|
| Material | Control | Test A | Test B |
| Silver carbonate | 24.97 | 24.66 | 24.41 |
| Silver oxide | 24.97 | 24.66 | 24.41 |
| Titanium dioxide | 29.97 | 29.59 | 29.29 |
| Lecithin | 0.10 | 0.10 | 0.10 |
| Polystyrene | 2.50 | 2.47 | 2.44 |
| Butadiene-styrene | 2.50 | 2.47 | 2.44 |
| 4% w/w Ag-coated glass beads | 14.99 | 14.80 | 14.65 |
| Aluminum hydroxide | | 1.25 | 1.25 |
| Sulfur | | | 1.01 |

Since months or even years of exposure to conditions of humidity and temperature are needed to effect chemical breakdown of the switches, accelerated testing is necessary. Therefore, the above-mentioned tests were subjected to a six-day period under conditions of 150° F. temperature and a relative humidity of 90% with the following result:

| Switch Behavior at 150° F. and 90% R.H. | | | |
|---|---|---|---|
| | Initial | After 5 days | After 6 days |
| Control | 4200 | 360 | 50 |
| Test A | 4000 | 4000 | 4100 |
| Test B | 4300 | 4500 | 4400 |

Each value represents the average breakdown voltage of 8-switches.

As can readily be seen from the above-enumerated comparison, the breakdown voltage of radiation-responsive switches having an admixture which includes aluminum hydroxide (a) or a combination of aluminum hydroxide and a sulfur compound (b) are vastly superior to an admixture lacking such features. Moreover, it has been found that extremely low concentrations of aluminum hydroxide, under 1.0% for example, gradually lose the above-described protective effect. Moreover, at high consentrations of aluminum hydroxide the non-conductivity of the aluminum hydroxide reduces the electrical conductivity of the switch causing possible failure due to high resistance after conversion by radiation from a flashlamp.

Accordingly, it has been found that the enhanced switches and photoflash units employing a blended binder material are even further improved, in so far as a resistance to humidity is concerned, by the addition thereto of a sulfur compound. Moreover, it has also been found that such switches and photoflash array are not only more resistant to humidity but that the switches and arrays are suitable to cameras employing relatively high and relatively low pulse potentials.

While there has been shown and described what is at present considered the preferred embodiments of the invention, it will be obvious to those skilled in the art that various changes and modifications may be made therein without departing from the invention as defined by the appended claims.

I claim:

1. A multilamp photoflash array having a plurality of flashlamps an electrical circuit connected to said flashlamps and to an energizing source and radiation-responsive switches connected to said circuit and located external and adjacent to said flashlamps and responsive to radiation therefrom, said switches each including an admixture of silver carbonate and/or silver oxide, titanium dioxide, a binder and aluminum hydroxide.

2. The multilamp photoflash array of claim 1 wherein said aluminum hydroxide is in the range of about 1.0 to 50.0% by weight.

3. The multilamp photoflash array of claim 1 wherein said aluminum hydroxide is in the range of about 1.0 to 2.0% by weight.

4. The multilamp photoflash array of claim 1 wherein said admixture includes about 24.66% silver carbonate, 24.66% silver oxide, 29.59% titanium dioxide, 14.80% of 4% silver-coated glass beads, a 50-50 mixture of polystyrene and butadiene and about 1.25% aluminum hydroxide.

5. A humidity resistant radiation-responsive switch for a multilamp photoflash array comprising an admixture of silver carbonate and/or silver oxide, titanium dioxide, a binder and aluminum hydroxide in the range of about 1.0 to 50.0% by weight of said admixture.

6. The humidity resistant radiation-responsive switch of claim 5 wherein said aluminum hydroxide is in the range of about 1.0 to 2.0% by weight.

7. A multilamp photoflash array having a plurality of flashlamps, an electrical circuit connected to said flashlamps and to an energizing source, and radiation-responsive switches connected to said circuit and located external and adjacent to said flashlamps and responsive to radiation therefrom, said switches each including an admixture of silver carbonate and/or silver oxide, titanium dioxide, a binder, aluminum hydroxide, and sulfur or a sulfide ion source, said sulfur or sulfide ion source being present in the range of about 0.01 to 5.0 percent by weight.

8. The multilamp photoflash array of claim 7 wherein said sulfur or sulfide ion source is present in the range of about 0.1 to 5.0 percent by weight.

9. The multilamp photoflash array of claim 8 wherein said sulfide ion source is selected from the group consisting of calcium sulfide, ferrous sulfide, and triethylphosphine sulfide.

10. The multilamp photoflash array of claim 7 wherein said switches each include the admixture of silver carbonate and/or silver oxide, titanium dioxide, a binder, aluminum hydroxide, and sulfur.

11. The multilamp photoflash array of claim 7 wherein said sulfide ion source is selected from the group consisting of calcium sulfide, ferrous sulfide, and triethylphosphine sulfide.

12. A humidity resistant radiation-responsive switch for a multilamp photoflash array comprising an admixture of silver carbonate and/or silver oxide, titanium dioxide, a binder, aluminum hydroxide in the range of about 1.0 to 50.0% by weight of said admixture, and about 0.01 to 5.0 percent by weight sulfur or a sulfide ion source.

13. The humidity resistant radiation-responsive switch of claim 12 wherein said admixture includes about 0.1 to 5% by weight sulfur or a sulfide ion source.

14. The humidity-resistant radiation-responsive switch of claim 13 wherein said sulfide ion source is selected from the group consisting of calcium sulfide, ferrous sulfide, and triethylphosphine sulfide.

15. The humidity-resistant radiation-responsive switch of claim 12 wherein said admixture includes silver carbonate and/or silver oxide, titanium dioxide, a binder, aluminum hydroxide in the range of about 1.0 to 50.0% by weight of said admixture, and about 0.01 to 5.0 percent by weight sulfur.

16. The humidity-resistant radiation-responsive switch of claim 12 wherein said sulfide ion source is selected from the group consisting of calcium sulfide, ferrous sulfide, and triethylphosphine sulfide.

* * * * *